United States Patent
Nguyen et al.

(10) Patent No.: US 10,738,584 B2
(45) Date of Patent: Aug. 11, 2020

(54) ENHANCING PROPPED COMPLEX FRACTURE NETWORKS

(71) Applicant: Halliburton Energy Services, Inc., Houston, TX (US)

(72) Inventors: Philip D. Nguyen, Houston, TX (US); Vladimir Nikolayevich Martysevich, Spring, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/315,590

(22) PCT Filed: Jul. 15, 2016

(86) PCT No.: PCT/US2016/042474
§ 371 (c)(1),
(2) Date: Jan. 4, 2019

(87) PCT Pub. No.: WO2018/013132
PCT Pub. Date: Jan. 18, 2018

(65) Prior Publication Data
US 2019/0226312 A1    Jul. 25, 2019

(51) Int. Cl.
*E21B 43/267* (2006.01)
*C09K 8/62* (2006.01)
*C09K 8/80* (2006.01)

(52) U.S. Cl.
CPC .............. *E21B 43/267* (2013.01); *C09K 8/62* (2013.01); *C09K 8/80* (2013.01)

(58) Field of Classification Search
CPC ................................ E21B 43/267; C09K 8/80
See application file for complete search history.

(56) References Cited

U.S. PATENT DOCUMENTS

| 4,078,609 A | 3/1978 | Pavlich |
| 9,140,109 B2 | 9/2015 | Suarez-Rivera et al. |

(Continued)

FOREIGN PATENT DOCUMENTS

| WO | 2015041690 A1 | 3/2015 |
| WO | 2015137955 | 9/2015 |

OTHER PUBLICATIONS

International Search Report and Written Opinion dated Mar. 31, 2017; International PCT Application No. PCT/US2016/042474.

(Continued)

*Primary Examiner* — Silvana C Runyan
(74) *Attorney, Agent, or Firm* — McGuireWoods LLP (57) ABSTRACT

Methods of increasing fracture complexity including introducing a solids-free high viscosity fracturing fluid into a subterranean formation at a pressure above the fracture gradient to create a dominate fracture, and thereafter introducing a low-viscosity pad fluid comprising micro-proppant and meso-proppant into the subterranean formation at a pressure above the fracture gradient to create a secondary branch fracture. The micro-proppant and meso-proppant are placed into the secondary branch fracture. A low-viscosity proppant slurry comprising macro-proppant and micro-proppant is introduced into the subterranean formation at a pressure above the fracture gradient, where the macro-proppant and micro-proppant are introduced into the dominate fracture. Fracture closure stress is applied and the meso-proppant transmits the closure stress to form tertiary branch fractures. The macro-proppant may also transmit the closure stress to form additional secondary branch fractures.

20 Claims, 3 Drawing Sheets

(56) References Cited

U.S. PATENT DOCUMENTS

| | | |
|---|---|---|
| 2012/0125617 A1 | 5/2012 | Gu et al. |
| 2013/0048282 A1 | 2/2013 | Adams et al. |
| 2013/0284437 A1 | 10/2013 | Nguyen et al. |
| 2014/0014338 A1* | 1/2014 | Crews .................... E21B 43/26 166/280.1 |
| 2014/0060828 A1 | 3/2014 | Nguyen et al. |
| 2014/0262291 A1 | 9/2014 | Chen et al. |
| 2016/0215205 A1* | 7/2016 | Nguyen ............... E21B 43/267 |
| 2018/0238160 A1* | 8/2018 | Nguyen .................. C09K 8/80 |

OTHER PUBLICATIONS

Chen, Cheng, et al. "Temporal evolution of the geometrical and transport properties of a fracture/proppant system under increasing effective stress." SPE Journal 20.03 (2015): 527-535.

Dahl, Jeff, et al. "Application of Micro-Proppant to Enhance Well Production in Unconventional Reservoirs: Laboratory and Field Results." SPE Western Regional Meeting. Society of Petroleum Engineers, 2015.

\* cited by examiner

ENHANCING PROPPED COMPLEX FRACTURE NETWORKS

BACKGROUND

The embodiments herein relate generally to subterranean formation operations and, more particularly, to enhancing complex fracture networks in subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure necessary to create or enhance at least one fracture in a particular subterranean formation location, increasing pressure within a formation may be achieved by placing fluid therein at a high flow rate.

Typically, particulate solids are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant form a proppant pack having interstitial spaces that act as conductive paths through which fluids produced from the formation may flow. As used herein, the term "proppant pack" refers to a collection of proppant in a fracture, thereby forming a "propped fracture." The degree of success of a stimulation operation depends, at least in part, upon the ability of the proppant pack to permit the flow of fluids through the interconnected interstitial spaces between proppant while maintaining open the fracture.

The complexity of a fracture network (or "network complexity") may be enhanced by stimulation operations to create new or enhance existing (e.g., elongate or widen) fractures, which may be interconnected. As used herein, the term "fracture network" refers to the access conduits, either natural or man-made or otherwise, within a subterranean formation that are in fluid communication with a wellbore penetrating the formation. The "complexity" of a fracture network refers to the amount of access conduits, man-made or otherwise, within a subterranean formation that are in fluid communication with a wellbore; the greater the amount of access conduits, the greater the complexity. A fracture network with enhanced complexity may increase the amount of produced fluids that may be recovered from a particular subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to subterranean formation operations and, more particularly, to enhancing complex fracture networks in subterranean formations by maximizing the exposed surface area to enable increased production rates.

The embodiments of the present disclosure provide for enhanced production of subterranean formations (i.e., wellbores in such formations), including in unconventional formations such as "tight formations," and grammatical variants thereof, defined as subterranean formations that have low or ultra-low permeability, as described below. The embodiments involve at least micro-proppant, meso-proppant, and macro-proppant placement in created complex fracture networks in subterranean formations penetrated by a wellbore using a plurality of fluid stages. As used herein and with reference the embodiments here described, the wellbore may be vertical, horizontal, or deviated (neither vertical, nor horizontal), without departing from the scope of the present disclosure.

Specifically, the embodiments described herein utilize meso-proppant that act as "micro-chisels" to create one or more microfractures, such as tertiary branch fractures extending from secondary branch fractures, as described in greater detail below. More particularly, the meso-proppant act as point-loads to transmit fracture closure stress energy into a formation face to effectively create or enhance the one or more tertiary branch fractures extending from one or more secondary branch fractures. That is, the contact point between the meso-proppant and the face of the secondary branch fracture, such that at that contact point the additional microfractures (e.g., tertiary branch fractures) are created or enhanced. Similarly, macro-proppant is placed within a dominate fracture and the macro-proppant may act as point-loads to transmit the same fracture closure stress energy into a formation face to effectively create or enhance one or more additional secondary branch fractures extending from the dominate fracture. As used herein, the term "fracture closure stress" or simply "closure stress," and grammatical variants thereof, refers to the stress (or pressure) at which a fracture effectively closes without proppant in place in the absence of hydraulic pressure. The proppant prevents the fracture from closing (or fully closing) at said stress. Accordingly, the present disclosure relies on not only traditional hydraulic fracturing techniques to create fracture network complexity, but also the ability of the meso-proppant and/or macro-proppant to create or generate additional microfractures (e.g., tertiary branch fractures and/or additional secondary branch fractures) to even further enhance complexity, and thus, greatly increase the exposed surface area (e.g., per unit reservoir volume) for hydrocarbon production in a particular formation.

The embodiments described herein involve formation of first a dominate fracture, followed by a series of microfractures that connect directly or indirectly to the dominate fracture. As used herein, the term "dominate fracture," and grammatical variants thereof, refers to a primary fracture extending from a wellbore. A "microfracture," and grammatical variants thereof, as used herein, refers to any fracture extending from a dominate fracture or extending from any non-dominate fracture (e.g., a secondary branch fracture, a tertiary branch fracture, and the like). That is, a secondary branch fracture is a microfracture extending from a dominate fracture. A tertiary branch fracture is a microfracture that extends from a secondary branch fracture. Microfractures, regardless of the type of fracture from which they originate, have a flow channel width or flow opening size of less than that of the dominate fracture or non-dominate fracture from which it extends. Typically, microfractures, regardless of the type of fracture from which they originate, have a flow channel width or flow opening size of from about 1 µm to about 100 µm, encompassing any value and subset therebetween. The microfractures may be cracks, slots, conduits, perforations, holes, or any other ablation within the formation. As used herein, the term "fracture" refers collectively to dominate fractures and microfractures, unless otherwise specified.

The use of the plurality of fluids described herein further allows at least partial separation of the formation of the dominate fracture and the formation of one or more microfractures, such that the dominate fracture can continue to grow in length as microfractures are created or extended therefrom. That is, the dominate fracture growth is not stunted due to leakoff in the non-length direction to form the microfractures using the methods described in the present disclosure. As used herein, the term "leakoff" refers to the tendency of fluid to be forced into a formation (e.g., due to a magnitude of pressure exerted on the formation such as during fluid introduction). Additionally, stress shadowing reduces the width of the dominate fracture, further encouraging growth thereof in length.

Multistage fracturing may also be used with the embodiments of the present disclosure to further enhance fracture complexity, and thus the hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir treatment intervals, or a plurality of locations within one or more reservoir treatment intervals, in the subterranean formation are stimulated in succession to create dominate fractures and microfractures at the various treatment interval locations, which may or may not interconnect. A "treatment interval," and grammatical variants thereof, refers to a finite length of a wellbore to be hydraulically fractured, and thus typically adjacent to a hydrocarbon producing reservoir. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a treatment interval, followed by at least a second fracture formed at the same or a different treatment interval in a subterranean formation. In some instances, multistage fracturing may involve fracturing a section of a treatment interval, followed by plugging the fracture such that a treatment fluid may be diverted to a different location in the same treatment interval or a different treatment interval for forming a second fracture. The second fracture may then be plugged and the process repeated until the desired number of fractures is formed.

One or more perforations may be located at a one or more treatment intervals to facilitate hydraulic fracturing of a dominate fracture. Accordingly, the embodiments of the present disclosure permit creation of multiple dominate fractures within a single set of perforation clusters, which can further have microfractures that may or may not interconnect at any length there-along (e.g., the near-wellbore or far-field regions) to further enhance fracture network complexity. As used herein, the term "perforation," and grammatical variants thereof, refers to a communication tunnel from inside a wellbore into a subterranean formation through which oil or gas is produced into a wellbore. A perforation may be made in a wellbore itself, or through casing or liner, which may or may not be cemented. The term "slot," and grammatical variants thereof, as used herein, refers to a type of perforation that has a slot shape, such that it has a narrow opening (e.g., rectangular in shape, and the like). Such perforations, slots, clusters of perforations, or clusters of slots are encompassed in the term "treatment interval," as used herein. Accordingly, a treatment interval may comprise a single perforation, a cluster of perforations, a single slot, a cluster of slots, or a combination thereof.

Other subterranean formation operations that may use the embodiments described herein may include, but are not limited to, re-fracturing operations (e.g., to add newly optimized perforated zones and initiate dominate fracture geometry), remedial treatments, completion operations, and the like, without departing from the scope of the present disclosure.

In some embodiments, the complex fracture network formation and production methods and systems described herein may be used in traditional subterranean formations or, more preferably, in tight formations. As described above, tight formations include formations having low or ultra-low permeability, such as shale formations, tight-gas formations (e.g., tight-gas sandstone formations), and the like. As used herein, the term "subterranean formation" or simply "formation," and grammatical variants thereof, refer to any type of subterranean formation, including tight formations, unless otherwise specified. The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation" or "low permeability tight formation," and grammatical variants thereof, refers to a tight formation that has a matrix permeability of less than 1,000 microdarcy (equivalent to 1 millidarcy). As used herein, the term "low-permeability formation" encompasses "ultra-low permeability formation" or "ultra-low permeability tight formation," and grammatical variants thereof, which refers to a tight formation that has a matrix permeability of less than 1 microdarcy (equivalent to 0.001 millidarcy).

Examples of low-permeability formations may include, but are not limited to, shale reservoirs and tight-gas sands. Shale reservoirs are sources of hydrocarbons comprising complex, heterogeneous rock with low permeability. Shale reservoirs may have permeabilities less than about 0.001 millidarcy (mD) ($9.869233 \times 10^{-19}$ m$^2$), and even less than about 0.0001 mD ($9.869233 \times 10^{-20}$ m$^2$). An example of such a shale reservoir is the Eagle Ford Formation in South Texas, U.S.A. Tight-gas sands are low permeability formations that produce mainly dry natural gas and may include tight-gas carbonates, tight-gas shales, coal-bed methane, tight sandstones, and the like. Tight-gas sands may have permeabilities less than about 1 mD ($9.869233 \times 10^{-16}$ m$^2$), and even as low as less than about 0.01 mD ($9.869233 \times 10^{-18}$ m$^2$).

It is preferred that the tight formation exhibits a brittle-type fracture failure mechanism, for which all examples of tight formations described herein are applicable. Thus, the brittle nature of the formation allows the meso-proppant to transmit the fracture closure stress to create a concentrated stress at the formation face and induce a microfracture rather than merely embed within the formation face.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments described herein, a plurality of fluid types are used, particularly with reference to viscosity, as well as proppant size and proppant size combinations, to create and enhance fracture network complexity. High-viscosity fluids are used in the embodiments herein typically to induce dominate fractures in the maximum stress direction of a formation, even if pre-existing fractures crossing the maximum stress direction exist. Such high-viscosity fluids may generate thick and planar dominate fractures with few microfractures extending therefrom, whereas low-viscosity fluids (e.g., slickwater, linear gel, and the like) generate narrow microfractures. The term "slickwater fluid," and grammatical variants thereof, refers to a low-viscosity linear fluid further comprising a friction reducing agent, such as polyacrylamide, to enable increased the flow of the fluid in the wellbore. The term "linear gel" refers to a non-crosslinked, low-viscosity fluid comprising a gelling agent that may be guar-based, cellulose-based, or other polymer-based systems that hydrate to create viscosity in a base fluid.

As used below, the term "treatment fluid" encompasses collectively each of the fluids used in the embodiments herein, unless otherwise specified. That is, the term "treatment fluid" may encompass all of the one or more of the high-viscosity fracturing fluid(s) (HVFF(s)), the low-viscosity pad fluid(s) (LVPadF(s)), and the low-viscosity proppant fluid(s) (LVPadF(s)).

One or more of the plurality of fluids described herein is thus described with reference to its viscosity, being a "high-viscosity fluid" or a "low-viscosity fluid." As used herein, the term "Thigh-viscosity fluid" refers to a fluid having a viscosity in the range of greater than about 100 centipoise (cP) to about 20000 cP, encompassing any value and subset therebetween. For example, the high-viscosity fluid may have a viscosity of greater than about 100 cP to about 4000 cP, or about 4000 cP to about 8000 cP, or about 8000 cP to about 1200 cP, or about 1200 cP to about 16000 cP, or about 16000 cP to about 20000 cP, encompassing any value and subset therebetween. Each of these values depends on a number of factors including, but not limited to, the type of subterranean formation, the desired dimensions of the dominate fracture, the viscosity of the low-viscosity fluid, and the like. As used herein, the term "low-viscosity fluid" refers to a fluid having a viscosity in the range of about 1 cP to about 100 cP, encompassing any value and subset therebetween. For example, the low-viscosity fluid may have a viscosity in the range of about 1 cP to about 20 cP, or about 20 cP to about 40 cP, or about 40 cP to about 60 cP, or about 60 cP to about 80 cP, or about 80 cP to about 100 cP, encompassing any value and subset therebetween. Each of these values depends on a number of factors including, but not limited to, the type of subterranean formation, the desired dimensions of the microfracture(s), the viscosity of the high-viscosity fluid, and the like.

In any embodiments described herein, the present disclosure provides a method comprising introducing a solids-free high-viscosity fracturing fluid (HVFF) into a subterranean formation at a pressure above the fracture gradient of the formation at a treatment interval, which may include one or more perforations (e.g., a single perforation or a perforation cluster). As used herein, the term "solids-free" with reference to a treatment fluid (either a high-viscosity fluid or a low-viscosity fluid) means that no solid particulates are intentionally introduced into the fluid; it does not preclude solid particulates from entering into the fluid as it traverses through oil and gas equipment or the formation (e.g., formation fines, and the like). The HVFF is introduced into the formation above the fracture gradient of the formation to create or enhance at least one dominate fracture in the treatment interval, which may be through one or more perforations thereat, for example. As described above, the HVFF has a viscosity in the range of about 50 cP to about 20000 cP, encompassing any value and subset therebetween. In other embodiments, the viscosity of the HVFF is in the range of about 50 cP to about 5000 cP, encompassing any value and subset therebetween.

Thereafter, a low-viscosity pad fluid (LVPadF) is introduced above the fracture gradient into the subterranean formation at the first treatment interval to create or enhance at least one secondary branch fracture (i.e., a type of microfracture, as defined above) extending from the at least one dominate fracture. The LVPadF comprises a base fluid, micro-proppant, and meso-proppant. The LVPadF as a whole creates or enhances the at least one secondary branch fracture, and the micro-proppant and meso-proppant are carried by the base fluid into the created or enhanced secondary branch fracture(s), wherein at least a portion of the micro-proppant and meso-proppant is placed or deposited therein. As used herein, the term "at least a portion" with reference to the placement of proppant (e.g., micro-proppant, meso-proppant, macro-proppant, and the like) means that at least about 20% of the proppant (or combination of proppant, where applicable) are placed within a fracture (e.g., a dominant fracture or a microfracture) and up to 100%.

After introduction of the HVFF and the LVPadF, at least a third fluid is introduced into the subterranean formation at a pressure above the fracture gradient. The third fluid is a low-viscosity proppant fluid (LVPropF) comprising a base fluid, micro-proppant and macro-proppant. The macro-proppant is carried and deposited into the dominate fracture, and any or all of the micro-proppant may remain in the dominate fracture while hydraulic pressure is maintained, or any or all may migrate within the interstitial spaces into the at least one secondary branch fracture while hydraulic pressure is maintained, or a combination thereof.

When the introduction of a fluid above hydraulic fracturing pressures is ceased, pressure is consequently dissipated (or removed) from inside the fracture into the subterranean formation, thereby resulting in the application of fracture closure stress. The fracture closure stress is applied to any proppant material that is contained within the fracture system, keeping the fracture system open (i.e., the at least one dominate fracture and the at least one secondary fracture). Dissipation of such pressure results in the creation or enhancement of at least one tertiary branch fracture extending from the at least one secondary branch fracture. Moreover, pressure loss during fracture closure may additionally result in the creation or enhancement of at least one additional secondary branch fracture extending from the dominate fracture. The mechanism is explained as follows with reference to the meso-proppant, where as the meso-proppant in the secondary branch fracture(s) experiences the fracture closure stress, it is of a size (larger than the micro-proppant but able to enter into the secondary branch fracture(s)) and composition that allows it to transmit the fracture closure stress through to the face of the secondary branch fracture(s) to create or enhance the at least one tertiary branch fracture. That is, the tertiary branch fracture(s) are created at the point contact between the meso-proppant and the face of the secondary branch fracture(s); the meso-proppant transmit the fracture closure stress energy to the face of the secondary branch fracture(s) at that contact point to facilitate creation of the tertiary branch fracture(s) extending therefrom. By the same mechanism, additional secondary branch fracture(s) may be created or enhanced at the point contact between the macro-proppant and the face of the dominate fracture.

Figure 1A:
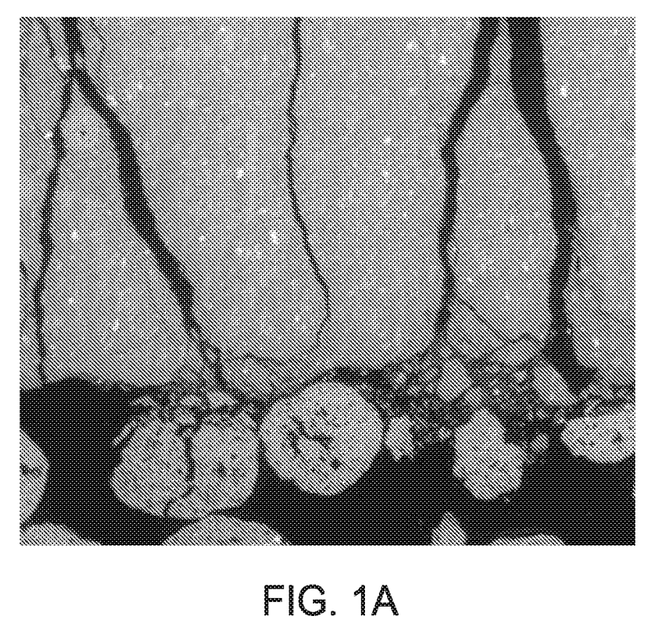
FIGS. 1A and 1B depict the ability of proppant to act as point-loads to transmit fracture closure stress and create microfractures, according to one or more embodiments of the present disclosure.
Figure 1B:
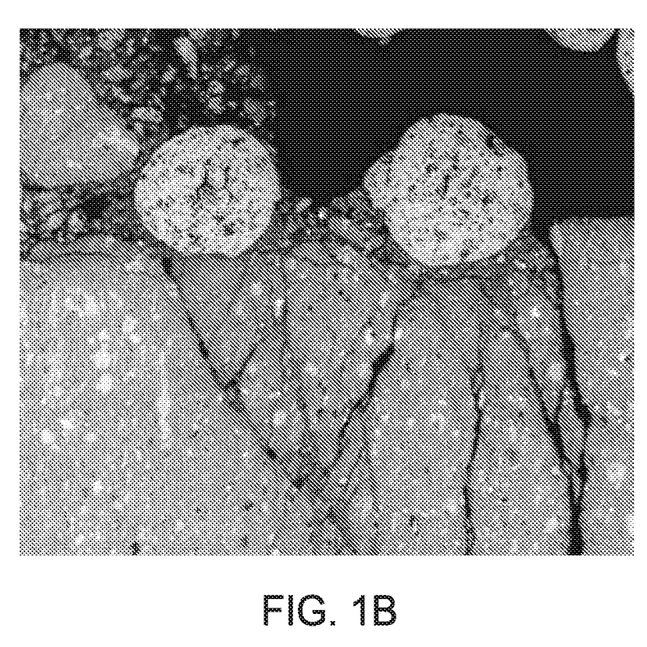

The phenomenon is illustrated in FIGS. 1A and 1B, which demonstrates how proppant (e.g., meso-proppant and/or macro-proppant) act as point-loads to transmit the fracture closure stress and create microfractures (e.g., tertiary branch fracture(s) and/or secondary branch fracture(s), respectively). The proppant are shown after experiencing equivalent fracture closure stress, and as illustrated, microfractures emanate from the fracture face at locations contacted by the proppant. FIGS. 1A and 1B are two different scanning electron microscope views of the same phenomenon. It is to be understood that while meso-proppant are used to create tertiary branch fractures extending from a secondary branch fracture and macro-proppant are used to create secondary branch fractures extending from a dominate fracture, other sized proppant may be used to extend microfractures depending on the size of the particular fracture or microfracture in which the proppant are to be placed to utilize fracture closure to extend additional microfractures therefrom, without departing from the scope of the present disclosure.

After the introduction of the various fluids described herein above the fracture gradient is ceased and the various fractures in the created or enhanced complex fracture network are allowed to close due to fracture closure stress, at least a portion of the micro-proppant in the dominate fracture and/or the secondary branch fracture(s) migrate into the newly created or enhanced at least one tertiary branch fracture(s). At least a portion of the micro-proppant in the dominate fracture may additionally migrate into any newly created or enhanced at least one secondary branch fracture(s). That is, the pressure exerted by the fracture closure stress forces the movement of the micro-proppant through the interstitial spaces of the macro-proppant in the dominate fracture and into the secondary and tertiary branch fracture(s) of the complex fracture network, and the movement of the micro-proppant from the secondary branch fracture(s) into the connected tertiary branch fracture(s). Accordingly, micro-proppant is present in both the secondary branch fracture(s) and the tertiary branch fracture(s), the meso-proppant remains in the secondary branch fracture(s) which they were placed, and the macro-proppant remains in the dominate fracture(s). Each fracture type is thus propped either wholly, in a partial or complete monolayer, or a partial or complete multilayer after pressure has dissipated and fracture closure of the complex fracture network has occurred. Upon putting the wellbore on production, then, hydrocarbons can freely flow through the interstitial spaces of the various proppant sizes within the increased surface area of the complex fracture network. Accordingly, as described above, the present disclosure allows use of proppant to enhance fracture complexity, thereby generating more contact surface area within the formation matrix to provide more connective flow paths for production.

In any embodiments described herein, the various proppant may be metered into the appropriate treatment fluids, rather than being pre-mixed, without departing from the scope of the present disclosure. In an alternative embodiment, for example, the micro-proppant and the macro-proppant in the LVPropF are metered into the formation as the LVPropF is introduced therein subsequent to metering in additional meso-proppant (i.e., additional to the meso-proppant in the LVPadF). Accordingly, the meso-proppant in the LVPropF can further migrate into the at least one secondary branch fracture during introducing of that portion of the LVPropF, or assist in aiding migration of the meso-proppant from the LVPadF into the at least one secondary branch fracture, or a combination thereof. Further, the micro-proppant and the macro-proppant in the LVPropF may be metered separately, in any order, or simultaneously, without departing from the scope of the present disclosure. Alternatively, two separate LVPropF types may be used, one having only meso-proppant, and the second having only the micro-proppant and the macro-proppant, without departing from the scope of the present disclosure. Alternatively, three separate LVPropF types may be used, one having only meso-proppant, the second having only one of the micro-proppant or the macro-proppant, and the third having only the other of the micro-proppant or the macro-proppant that is not included in the second LVPropF, without departing from the scope of the present disclosure.

The method described herein of introducing the HVFF, the LVPadF, the LVPropF (one or more), stopping pumping and allowing the pressure to dissipate and the fractures to close upon encountering fracture closure stress, forming tertiary branch fracture(s), and migrating micro-proppant therein can be repeated one or more times at a same treatment interval, or be repeated one or more times at a different treatment interval. In this manner, the complex fracture network can be extended along a length of the wellbore in the formation and multiple dominate fractures and microfractures extending therefrom can be created or enhanced. In such instances, the various microfractures extending from dominate fractures in different treatment intervals may extend and interconnect, further enhancing the production capability of the formation. Additionally, one or more of the steps described herein can be repeated one or more times in the same interval or a different interval without the entire process being performed, such as to ensure that the particular functional aspect of the step is achieved (e.g., forming a desired length and width of the dominate fracture, and the like).

The base fluids for use in forming the treatment fluids (i.e., the HVFF, the LVPadF, and one or more LVPropF) described herein include, but are not limited to, aqueous-based fluids, aqueous-miscible fluids, liquid oil-based fluids, liquid gas-based fluids, and any combination thereof. Suitable aqueous-based fluids may include, but are not limited to, fresh water, saltwater (e.g., water containing one or more salts dissolved therein), brine (e.g., saturated salt water), seawater, wastewater, produced water, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Examples of suitable liquid oil-based fluids may include, but are not limited to, liquid methane, liquid propane, and any combination thereof. Suitable liquid gas-based fluids may include, but are not limited to, liquid carbon dioxide, liquid natural gas, liquid petroleum gas, and any combination thereof. In any or all embodiments, one or more treatment fluids may have additives included in addition to the proppant described herein that are best suited to a particular base fluid and the use of the particular treatment fluid, as described above.

The micro-proppant, meso-proppant, and macro-proppant of the present disclosure (collectively referred to herein simply as "proppant") may be composed of the same type of materials, although the various proppant sizes used in any single or multiple stages of a fracturing operation need not be composed of the same material (although they may be), without departing from the scope of the present disclosure. Similarly, the shape(s) of the proppant may be the same or different, without departing from the scope of the present disclosure. Accordingly, in some embodiments, the proppant differ only in their size, whereas in other embodiments, they may differ in one or more of material composition and/or shape, as well as size.

Examples of suitable materials for forming the proppant of the present disclosure may include, but are not limited to, sand, ceramic materials, glass materials, polymer materials (e.g., polystyrene, polyethylene, etc.), nut shell pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. As used herein, the term "sand" refers to naturally occurring granular material composed of rock and mineral particulates (e.g., desert sand, beach sand). Nut shells may be from any fruit consisting of a hard or tough shell (encompassing seed and pit shells) including, but not limited to, pecan, walnut, pine, hazelnut, chestnut, acorn, brazil, candlenut, coconut, cashew, pistachio, and the like, and any combination thereof. The term "ceramic material" includes any inorganic crystalline material, compounded of a metal and a non-metal. Examples of suitable ceramics for use as the micro-proppant and/or proppant particulates herein include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof.

The shape of the various proppant described herein may be of any shape capable of meeting the desired unit mesh size or unit mesh size range, as described below. For example, the proppant may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal proppant may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The micro-proppants of the present disclosure have a unit mesh particle size in the range of about 0.1 micrometers (μm) to 20 μm, encompassing any value and subset therebetween. As used herein, the term "unit mesh particle size" or simply "unit mesh size" refers to a size of an object (e.g., a proppant) that is able to pass through a square area having each side thereof equal to the specified numerical value provided herein. Accordingly, the micro-proppant may have a unit mesh size of about 0.1 μm to 1 μm, or 1 μm to 4 μm, or 4 μm to 8 μm, or 8 μm to 12 μm, or 12 μm to 16 μm, or 16 μm to 20 μm, or 1 μm to 16 μm, or 4 μm to 12 μm, encompassing any value and subset therebetween. Each of these values may depend on a number of factors including, but not limited to, the type of subterranean formation being treated, the size of the microfractures formed therein, the shape of the micro-proppant selected, and the like, and any combination thereof.

Generally, the micro-proppant is included in the LVPadF in an amount in the range of about 1.2 grams per liter (g/L) to about 120 g/L of the base fluid in the LVPadF, encompassing any value and subset therebetween. One (1) gram per liter is equivalent to 0.008336 pounds per gallon (ppg), thus equivalently the micro-proppant may be included is included in the LVPadF in an amount in the range of about 0.01 ppg to about 1.0 ppg of the base fluid in the LVPadF, encompassing any value and subset therebetween. For example, the micro-proppant may be included in the LVPadF in an amount of about 1.2 g/L to about 24 g/L, or about 24 g/L to about 48 g/L, or about 48 g/L to about 72 g/L, or about 72 g/L to about 96 g/L, or about 96 g/L to about 120 g/L, or about 24 g/L to about 96 g/L of the base fluid in the LVPadF, encompassing any value and subset therebetween. Each of these values depends on a number of factors including, but not limited to, the type of subterranean formation being treated, the size of the microfractures formed therein, the shape of the micro-proppant selected, and the like, and any combination thereof.

The micro-proppant in the LVPropF may be in the same concentration as included in the LVPadF, or in preferred embodiments, in a lesser amount. In particular, in some embodiments, the micro-proppant is included in the LVPropF in an amount in the range of about 1.2 g/L to about 24 g/L of the base fluid in the LVPropF (equivalent to about 0.01 ppg to about 0.2 ppg of the base fluid in the LVPropF), encompassing any value and subset therebetween. For example, the micro-proppant may be included in the LVPropF in an amount of about 1.2 g/L to about 4 g/L, or about 4 g/L to about 8 g/L, or about 8 g/L to about 12 g/L, or about 12 g/L to about 16 g/L, or about 16 g/L to about 20 g/L, or about 20 g/L to about 24 g/L, or about 4 g/L to about 20 g/L, or about 8 g/L to about 16 g/L of the base fluid in the LVPropF, encompassing any value and subset therebetween. Each of these values depends on a number of factors including, but not limited to, the type of subterranean formation being treated, the size of the microfractures formed therein, the shape of the micro-proppant selected, and the like, and any combination thereof.

In all instances, the meso-proppants of the present disclosure have a unit mesh particle size that is greater than that of the micro-proppant and less than the diameter of the secondary branch fracture(s) in which they are to be placed or deposited. Accordingly, in some embodiments, the meso-proppant may have a unit mesh size of greater than 20 μm to 100 μm, encompassing any value and subset therebetween. For example, the meso-proppant may have a unit mesh size of greater than 20 μm to 36 μm, or 36 μm to 52 μm, or 52 μm to 68 μm, or 68 μm to 84 μm, or 84 μm to 100 μm, or 36 μm to 84 μm, encompassing any value and subset therebetween. Each of these values may depend on a number of factors including, but not limited to, the type of subterranean formation being treated, the size of the secondary branch fracture(s) formed therein, the shape of the meso-proppant selected, and the like, and any combination thereof.

Generally, the meso-proppant is included in the LVPadF for described herein in a ratio to the micro-proppant (meso-proppant:micro-proppant) of about 1:10 to about 1:100, encompassing any value and subset therebetween. For example, the ratio of meso-proppant to micro-proppant in the LVPadF may be in the range of about 1:10 to about 1:25, or about 1:25 to about 1:50, or about 1:50 to about 1:75, or about 1:75 to about 1:100, or about 1:25 to about 1:75, encompassing any value and subset therebetween. In some instances, the ratio of the first meso-proppant to the first micro-proppant is about 1:10 to 1:25 to about 1:50 to 1:100, encompassing any value and subset therebetween.

When meso-proppant are included in the LVPropF, either in a single fluid or metered therein, they are generally present in an amount of from about 12 g/L to about 600 g/L of the base fluid of the LVPropF (equivalent to about 0.1 ppg to about 5 ppg of the base fluid in the LVPropF), encompassing any value and subset therebetween. For example, the meso-proppant may be included in the LVPropF in an amount of about 12 g/L to about 100 g/L, or about 100 g/L to about 200 g/L, or about 200 g/L to about 300 g/L, or about 300 g/L to about 400 g/L, or about 400 g/L to about 500 g/L, or about 500 g/L to about 600 g/L, or about 100 g/L to about 500 g/L, or about 200 g/L to about 400 g/L of the base fluid of the LVPropF, encompassing any value and subset therebetween. Each of these values depends on a number of factors including, but not limited to, the type of subterranean formation being treated, the size of the secondary branch fractures formed therein, the shape of the meso-proppant selected, and the like, and any combination thereof.

The macro-proppant described herein may have a size greater than that of the meso-proppant and up to the diameter of the dominate fracture(s) in which they are to be placed or deposited to keep the dominate fracture(s) propped upon fracture closure. Accordingly, in some embodiments, the macro-proppant have a size greater than 100 μm. In some instances, the macro-proppant have a size greater than 100 μm to about 1000 μm, encompassing any value and subset therebetween. For example, the macro-proppant may have a size in the range of greater than 100 μm to 200 μm, or 200 μm to 300 μm, or 300 μm to 400 μm, or 400 μm to 500 μm, or 500 μm to 600 μm, or 600 μm to 700 μm, or 700 μm to 800 μm, or 800 μm to 900 μm, or 900 μm to about 1000 μm, or 200 μm to 900 μm, or 300 μm to 800 μm, or 400 μm to 700 μm, encompassing any value and subset therebetween. Each of these values depends on a number of factors including, but not limited to, the crush resistance of the macro-proppant, the operational conditions, the size of the dominate fracture(s), the type of subterranean formation, and the like, and any combination thereof.

The macro-proppant are included in the LVPropF in a concentration sufficient to prop the one or more dominate fractures created or enhanced using the methods described herein. In some embodiments, the macro-proppant is present in an amount in the range of about 12 g/L to about 1200 g/L of the base fluid of the LVPropF (equivalent to about 0.1 ppg to about 10 ppg of the base fluid in the LVPropF), encompassing any value and subset therebetween. For example, the macro-proppant may be included in the LVPropF in an amount of about 12 g/L to about 200 g/L, or about 200 g/L to about 400 g/L, or about 400 g/L to about 600 g/L, or about 600 g/L to about 800 g/L, or about 800 g/L to about 1000 g/L, or about 1000 g/L to about 1200 g/L, or about 200 g/L to about 1000 g/L, or about 400 g/L to about 800 g/L of the base fluid of the LVPropF, encompassing any value and subset therebetween. Each of these values depends on a number of factors including, but not limited to, the type of subterranean formation being treated, the size of the dominate fracture(s) formed therein, the shape of the macro-proppant selected, and the like, and any combination thereof.

In some embodiments, degradable particulates may be included in any or all of the treatment fluids comprising proppant described herein. When included, the degradable particulates can degrade downhole, such as after their placement in a fracture, to increase the conductivity of the fracture, and the porosity of the propped fracture. The degradable particulates can also be used to create proppant-free channels through which hydrocarbons can flow. Any degradable particulate suitable for use in a subterranean formation may be used in accordance with the embodiments described herein. For example, some suitable degradable particulates include, but are not limited to, degradable polymers, dehydrated salts, and any combination thereof. As for degradable polymers, a polymer is considered to be "degradable" herein if the degradation is due to, in situ, a chemical and/or radical process such as hydrolysis, or oxidation.

Any or all of the treatment fluids described herein may further include one or more additives, such as, but not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
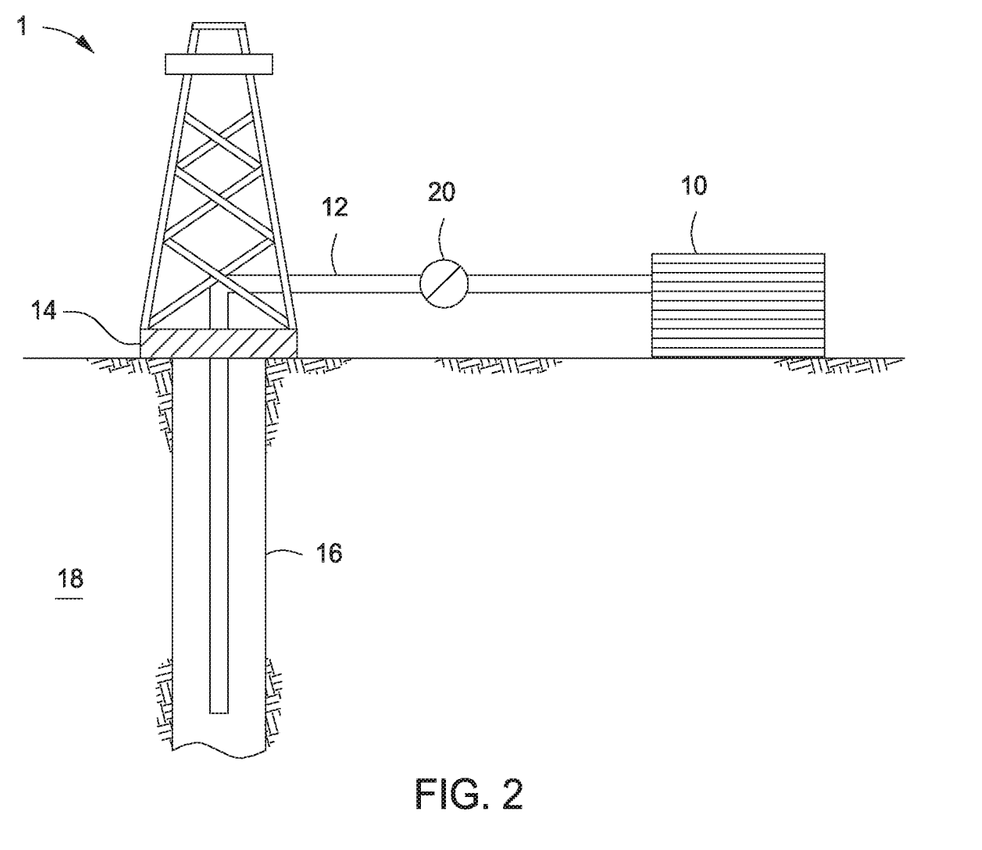
FIG. 2 depicts an embodiment of a system configured for delivering various treatment fluids of the embodiments described herein to a downhole location, according to one or more embodiments of the present disclosure.

FIG. 2 shows an illustrative schematic of a system that can deliver the treatment fluids (i.e., the HVFF, the LVPadF, the LVPropF) of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid or a portion thereof may, in some embodiments, flow back to wellhead 14 and exit subterranean formation 18. In some embodiments, the treatment fluid that has flowed back to wellhead 14 may subsequently be recovered and recirculated to subterranean formation 18, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments Disclosed Herein Include:

Embodiment A: A method comprising: (a) introducing a solids-free high-viscosity fracturing fluid (HVFF) into a subterranean formation at a first treatment interval and at a pressure above a fracture gradient of the subterranean formation to create or enhance at least one dominate fracture therein; (b) introducing a low-viscosity pad fluid (LVPadF) into the subterranean formation at a pressure above the fracture gradient, wherein the LVPadF comprises a first base fluid, first micro-proppant, and meso-proppant present in a concentration less than the first micro-proppant; (c) creating at least one first secondary fracture extending from the at least one dominate fracture with the LVPadF; (d) placing at least a portion of the first micro-proppant and at least a portion of the meso-proppant into the at least one first secondary fracture; (e) introducing a low-viscosity proppant slurry (LVPropF) into the subterranean formation at a pressure above the fracture gradient, wherein the LVPropF comprises a second base fluid, second micro-proppant, and macro-proppant; (f) placing at least a portion of the macro-proppant into the dominate fracture; (g) dissipating hydraulic pressure thereby applying fracture closure stress, the fracture closure stress creating at least one tertiary branch fracture extending from the at least one first secondary branch fracture; and (h) migrating at least a portion of proppant selected from the group consisting of the first micro-proppant, the second micro-proppant, and any combination thereof into the at least one tertiary branch fracture.

Embodiments A may have one or more of the following additional elements in any combination:

Element A1: Wherein the at least one tertiary branch fracture is created at a contact point between the meso-proppant and a face of the at least one first secondary branch fracture due to transmission of the fracture closure stress to the face of the at least one first secondary branch fracture through the meso-proppant.

Element A2: Further comprising creating at least one second secondary branch fracture extending from the dominate fracture upon dissipation of the hydraulic pressure thereby applying the fracture closure stress, wherein the at least one second secondary branch fracture is created at a contact point between the macro-proppant and a face of the dominate fracture due to transmission of the fracture closure stress to the face of the dominate fracture through the macro-proppant.

Element A3: Further comprising repeating steps (a) through (h) at at least a second treatment interval.

Element A4: Wherein the first micro-proppant are present in the LVPadF in a concentration of about 1.2 grams per liter to about 120 grams per liter of the first base fluid.

Element A5: Wherein the ratio of the first meso-proppant to the first micro-proppant is about 1:10 to about 1:100.

Element A6: Wherein the second micro-proppant is present in the LVPropF in a concentration of about 1.2 grams per liter to about 24 grams per liter of the second base fluid.

Element A7: Wherein the macro-proppant is present in the LVPropF in a concentration of about 12 grams per liter to about 1200 grams per liter of the second base fluid.

Element A8: Wherein the first micro-proppant and the second micro-proppant have a unit mesh size in the range of about 0.1 micrometer to 20 micrometers.

Element A9: Wherein the meso-proppant have a unit mesh size that is greater than the first micro-proppant and the second micro-proppant, but less than a diameter of the secondary branch fracture.

Element A10: Wherein the meso-proppant have a unit mesh size in the range of greater than 20 micrometers to 100 micrometers.

Element A11: Wherein the macro-proppant have a unit mesh size in the range of greater than 100 micrometers.

Element A12: Wherein the macro-proppant have a unit mesh size in the range of greater than 100 micrometers to about 1000 micrometers.

Element A13: Wherein the subterranean formation is a tight formation.

Element A14: Further comprising a tubular extending into the subterranean formation and a pump fluidly coupled to the tubular, the tubular containing a fluid selected from the group consisting of the HVFF, the LVPadF, the LVPropF, and any combination thereof.

By way of non-limiting example, exemplary combinations applicable to A include: A1-A14; A2, A4 and A7; A8 and A9; A1, A3, A4, A5, and A10; A12 and A13; A6, A8, A11, and A12; A12 and A14; A7, A9, and A10; and any combination of A1-A14, without limitation.

Embodiment B: A method comprising: (a) introducing a solids-free high-viscosity fracturing fluid (HVFF) into a subterranean formation at a first treatment interval and at a pressure above a fracture gradient of the subterranean formation to create or enhance at least one dominate fracture therein; (b) introducing a low-viscosity pad fluid (LVPadF) into the subterranean formation at a pressure above the fracture gradient, wherein the LVPadF comprises a first base fluid, first micro-proppant, and first meso-proppant present in a concentration less than the first micro-proppant; (c) creating at least one first secondary fracture extending from the at least one dominate fracture with the LVPadF; (d) placing at least a portion of the first micro-proppant and at least a portion of the first meso-proppant into the at least one first secondary fracture; (e) introducing a low-viscosity proppant slurry (LVPropF) comprising a second base fluid into the subterranean formation at a pressure above the fracture gradient, wherein (e1) second meso-proppant are metered into the LVPropF as it is introduced into the subterranean formation, and thereafter wherein (e2) second micro-proppant and macro-proppant are metered into the LVPropF as it is introduced into the subterranean formation; (f) placing at least a portion of the second meso-proppant into the at least one first secondary branch fracture; (g) placing at least a portion of the macro-proppant into the dominate fracture; (h) dissipating hydraulic pressure thereby applying fracture closure stress, the fracture closure stress creating at least one tertiary branch fracture extending from the at least one first secondary branch fracture; and (i) migrating at least a portion of proppant selected from the group consisting of the first micro-proppant, the second micro-proppant, and any combination thereof into the at least one tertiary branch fracture.

Embodiment B may have one or more of the following additional elements in any combination:

Element B1: Wherein the at least one tertiary branch fracture is created at a contact point between meso-proppant selected from the group consisting of the first meso-proppant, the second meso-proppant, and any combination thereof and a face of the at least one first secondary branch fracture due to transmission of the fracture closure stress to the face of the at least one first secondary branch fracture through the first meso-proppant and/or second meso-proppant.

Element B2: Further comprising creating at least one second secondary branch fracture extending from the dominate fracture upon dissipation of the hydraulic pressure thereby applying the fracture closure stress, wherein the at least one second secondary branch fracture is created at a contact point between the macro-proppant and a face of the dominate fracture due to transmission of the fracture closure stress to the face of the dominate fracture through the macro-proppant.

Element B3: Further comprising repeating steps (a) through (i) at at least a second treatment interval.

Element B4: Wherein the first micro-proppant are present in the LVPadF in a concentration of about 1.2 grams per liter to about 120 grams per liter of the first base fluid.

Element B5: Wherein the ratio of the first meso-proppant to the first micro-proppant is about 1:10 to about 1:100.

Element B6: Wherein the second micro-proppant is present in the LVPropF in a concentration of about 1.2 grams per liter to about 24 grams per liter of the second base fluid.

Element B7: Wherein the macro-proppant is present in the LVPropF in a concentration of about 12 grams per liter to about 1200 grams per liter of the second base fluid.

Element B8: Wherein the first micro-proppant and the second micro-proppant have a unit mesh size in the range of about 0.1 micrometer to 20 micrometers.

Element B9: Wherein the first meso-proppant and the second meso-proppant have a unit mesh size that is greater than the first micro-proppant and the second micro-proppant, but less than a diameter of the secondary branch fracture.

Element B10: Wherein the first meso-proppant and the second meso-proppant have a unit mesh size in the range of greater than 20 micrometers to 100 micrometers.

Element B11: Wherein the macro-proppant have a unit mesh size in the range of greater than 100 micrometers.

Element B12: Wherein the macro-proppant have a unit mesh size in the range of greater than 100 micrometers to about 1000 micrometers.

Element B13: Wherein the subterranean formation is a tight formation.

Element B14: Further comprising a tubular extending into the subterranean formation and a pump fluidly coupled to the tubular, the tubular containing a fluid selected from the group consisting of the HVFF, the LVPadF, the LVPropF, and any combination thereof.

Element B15: Wherein the second micro-proppant and the macro-proppant are metered into the LVPropF simultaneously, or the second micro-proppant and the macro-proppant are metered separately in any order.

By way of non-limiting example, exemplary combinations applicable to B include: B1-B15; B1, B3, B4, and B11; B12 and B15; B2, B7, B8, B10, and B13; B6, B8, and B15; B2, B9, B10, and B12; B3 and B13; and any combination of B1-B15, without limitation.

To facilitate a better understanding of the embodiments of the present disclosure, the following example of preferred or representative embodiment is given. In no way should the following example be read to limit, or to define, the scope of the present disclosure.

EXAMPLE

In this example, the ability of a microfracture to be created at contact points with proppant upon fracture closure stress application was evaluated. Two cylindrical core plugs formed of a shale formation were prepared, the plugs having a 2.54 centimeter (cm) (equivalent to 1 inch (in)) diameter and a 5.08 cm (equivalent to 2 in) length. Shale is a sedimentary rock formed from the consolidation of fine clay and silt materials into laminated, thin bedding planes.

Figure 3A:
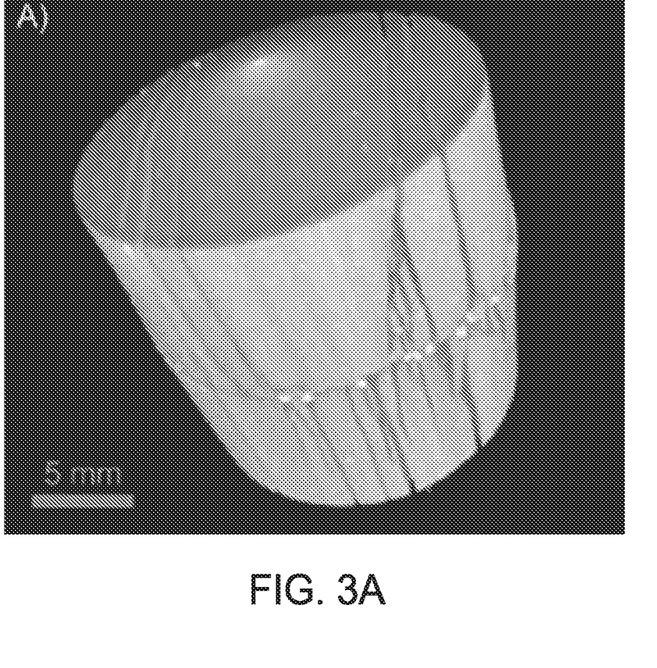
FIGS. 3A and 3B depict the ability of proppant to act as point-loads to transmit fracture closure stress and create microfractures, according to one or more embodiments of the present disclosure.
Figure 3B:
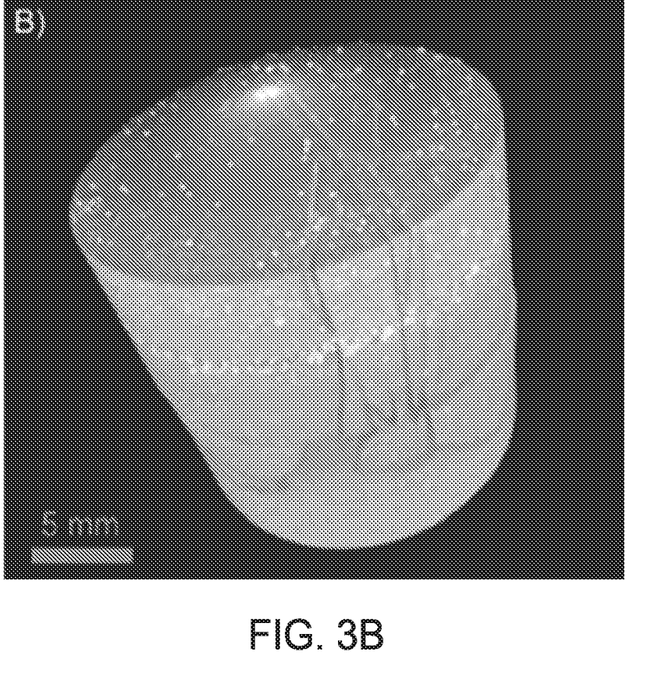

Each of the plugs was prepared by cutting the plugs in half (not necessarily even halves) and reassembling them with 0.04 pound-mass per square foot ($lbm/ft^2$) of 20/40 Mesh U.S. Sieve Series high-strength sintered bauxite proppant placed therebetween. The space between the two halves comprising the proppant simulated a propped, hydraulically created dominate fracture. The plugs were formed such that the simulated dominate fracture was either perpendicular to the bedding planes (as shown in FIG. 3A) or parallel to the bedding planes (as shown in FIG. 3B) of the shale formation plug. Each plug was retained in a plastic cylindrical sleeve and subjected to mechanical loading to simulate fracture closure stress.

Referring now to FIG. 3A, a CT image is shown in which the shale plug has the dominate fracture perpendicular to the bedding planes after being subjected to 3000 pounds per square inch (psi) loading. As depicted, the dominate fracture is horizontal across the approximate midsection of the plug and microfractures extend therefrom, indicating the ability of the proppant to transmit the fracture closure stress and create microfractures extending from the dominate fracture. With reference now to FIG. 3B, a CT image is shown in which the shale plug has the dominate fracture parallel to the bedding planes after being subjected to 7000 psi loading. As depicted, the dominate fracture is horizontal across an upper portion of the plug and microfractures extend therefrom, indicating the ability of the proppant to transmit the fracture closure stress and create microfractures extending from the dominate fracture. Accordingly, regardless of the orientation of the bedding planes and the dominate fracture, proppant can be effectively used as point loads to transmit fracture closure stress to create microfractures extending from the contact point of the proppant.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) introducing a solids-free high-viscosity fracturing fluid (HVFF) into a subterranean formation at a first treatment interval and at a pressure above a fracture gradient of the subterranean formation to create or enhance at least one dominate fracture therein, wherein the HVFF has a viscosity of about 100 cP to about 20,000 cP;
   (b) introducing a low-viscosity pad fluid (LVPadF) into the subterranean formation at a pressure above the fracture gradient, wherein LVPadF has a viscosity of about 1 cP to about 100 cP,
   wherein the LVPadF comprises a first base fluid, first micro-proppant, and meso-proppant present in a concentration less than the first micro-proppant;
   (c) creating at least one first secondary fracture extending from the at least one dominate fracture with the LVPadF;
   (d) placing at least a portion of the first micro-proppant and at least a portion of the meso-proppant into the at least one first secondary fracture;
   (e) introducing a low-viscosity proppant slurry (LVPropF) into the subterranean formation at a pressure above the fracture gradient, wherein LVPropF has a viscosity of about 1 cP to about 100 cP,
   wherein the LVPropF comprises a second base fluid, second micro-proppant, and macro-proppant;
   (f) placing at least a portion of the macro-proppant into the dominate fracture;
   (g) removing hydraulic pressure thereby applying fracture closure stress, the fracture closure stress thereby forces at least a portion of the proppant selected from the group consisting of the first micro-proppant, the second micro-proppant, and any combination thereof to create at least one tertiary branch fracture extending from the at least one first secondary branch fracture.

2. The method of claim 1, wherein the at least one tertiary branch fracture is created at a contact point between the meso-proppant and a face of the at least one first secondary branch fracture due to transmission of the fracture closure stress to the face of the at least one first secondary branch fracture through the meso-proppant.

3. The method of claim 1, further comprising creating at least one second secondary branch fracture extending from the dominate fracture upon dissipation of the hydraulic pressure thereby applying the fracture closure stress, wherein the at least one second secondary branch fracture is created at a contact point between the macro-proppant and a face of the dominate fracture due to transmission of the fracture closure stress to the face of the dominate fracture through the macro-proppant.

4. The method of claim 1, further comprising repeating steps (a) through (h) at least a second treatment interval.

5. The method of claim 1, wherein the first micro-proppant are present in the LVPadF in a concentration of about 1.2 grams per liter to about 120 grams per liter of the first base fluid.

6. The method of claim 1, wherein the ratio of the first meso-proppant to the first micro-proppant is about 1:10 to about 1:100.

7. The method of claim 1, wherein the second micro-proppant is present in the LVPropF in a concentration of about 1.2 grams per liter to about 24 grams per liter of the second base fluid.

8. The method of claim 1, wherein the macro-proppant is present in the LVPropF in a concentration of about 12 grams per liter to about 1200 grams per liter of the second base fluid.

9. The method of claim 1, wherein the first micro-proppant and the second micro-proppant have a unit mesh size in the range of about 0.1 micrometer to 20 micrometers.

10. The method of claim 1, wherein the meso-proppant have a unit mesh size that is greater than the first micro-proppant and the second micro-proppant, but less than a diameter of the secondary branch fracture.

11. The method of claim 1, wherein the meso-proppant have a unit mesh size in the range of greater than 20 micrometers to 100 micrometers.

12. The method of claim 1, wherein the macro-proppant have a unit mesh size in the range of greater than 100 micrometers.

13. The method of claim 1, wherein the macro-proppant have a unit mesh size in the range of greater than 100 micrometers to about 1000 micrometers.

14. The method of claim 1, wherein the subterranean formation is a tight formation comprising a permeability of about 1,000 microdarcy or less.

15. The method of claim 1, further comprising a tubular extending into the subterranean formation and a pump fluidly coupled to the tubular, the tubular containing a fluid selected from the group consisting of the HVFF, the LVPadF, the LVPropF, and any combination thereof.

16. A method comprising:
   (a) introducing a solids-free high-viscosity fracturing fluid (HVFF) into a subterranean formation at a first treatment interval and at a pressure above a fracture gradient of the subterranean formation to create or enhance at least one dominate fracture therein, wherein HVFF has a viscosity of about 100 cP to about 20,000 cP;
   (b) introducing a low-viscosity pad fluid (LVPadF) into the subterranean formation at a pressure above the fracture gradient, wherein LVPadF has a viscosity of about 1 cP to about 100 cP,
   wherein the LVPadF comprises a first base fluid, first micro-proppant, and first meso-proppant present in a concentration less than the first micro-proppant;

(c) creating at least one first secondary fracture extending from the at least one dominate fracture with the LVPadF;

(d) placing at least a portion of the first micro-proppant and at least a portion of the first meso-proppant into the at least one first secondary fracture;

(e) introducing a low-viscosity proppant slurry (LVPropF) comprising a second base fluid into the subterranean formation at a pressure above the fracture gradient, wherein LVPropF has a viscosity of about 1 cP to about 100 cP, wherein (e1) second meso-proppant are metered into the LVPropF as it is introduced into the subterranean formation, and thereafter wherein (e2) second micro-proppant and macro-proppant are metered into the LVPropF as it is introduced into the subterranean formation;

(f) placing at least a portion of the second meso-proppant into the at least one first secondary branch fracture;

(g) placing at least a portion of the macro-proppant into the dominate fracture;

(h) removing hydraulic pressure thereby applying fracture closure stress, the fracture closure stress thereby forces at least a portion of the proppant selected from the group consisting of the first micro-proppant the second micro-proppant, and any combination thereof to create at least one tertiary branch fracture extending from the at least one first secondary branch fracture.

17. The method of claim 16, wherein the at least one tertiary branch fracture is created at a contact point between meso-proppant selected from the group consisting of the first meso-proppant, the second meso-proppant, and any combination thereof and a face of the at least one first secondary branch fracture due to transmission of the fracture closure stress to the face of the at least one first secondary branch fracture through the first meso-proppant and/or second meso-proppant.

18. The method of claim 16, further comprising creating at least one second secondary branch fracture extending from the dominate fracture upon dissipation of the hydraulic pressure thereby applying the fracture closure stress, wherein the at least one second secondary branch fracture is created at a contact point between the macro-proppant and a face of the dominate fracture due to transmission of the fracture closure stress to the face of the dominate fracture through the macro-proppant.

19. The method of claim 16, wherein the second micro-proppant and the macro-proppant are metered into the LVPropF simultaneously, or the second micro-proppant and the macro-proppant are metered separately in any order.

20. The method of claim 16, further comprising repeating steps (a) through (i) at least a second treatment interval.

* * * * *